Figure 1:
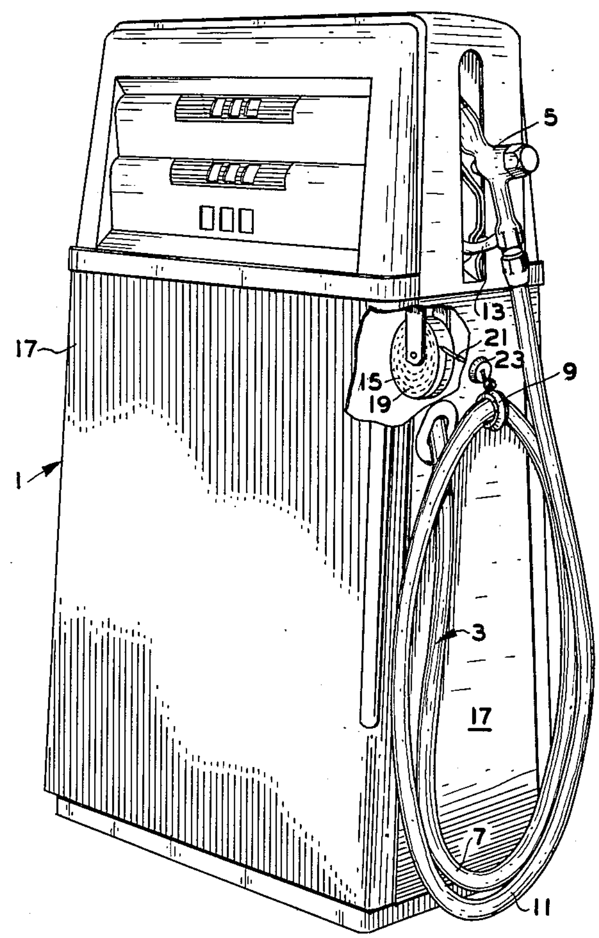

Oct. 31, 1961 G. W. WRIGHT ET AL 3,006,047

HOSE SLING

Filed April 18, 1960 2 Sheets-Sheet 1

GEORGE W. WRIGHT
HAROLD N. LEE
*INVENTORS*

BY Edmund W. Kamm
ATTORNEY

HOSE SLING
Filed April 18, 1960 2 Sheets-Sheet 2
FIG. 2
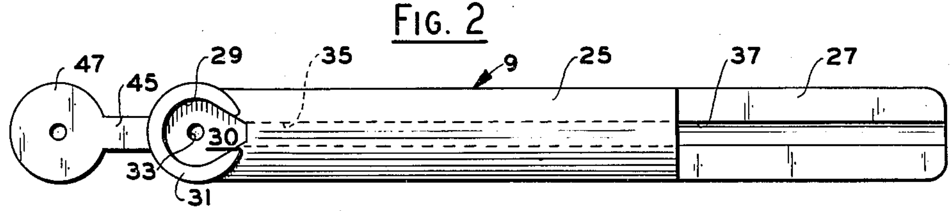
FIG. 3
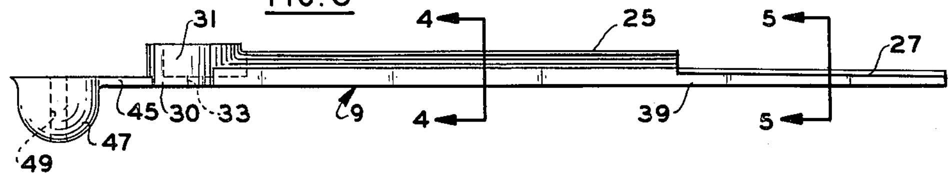
FIG. 4
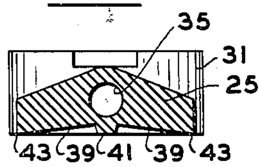
FIG. 5
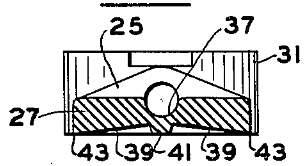
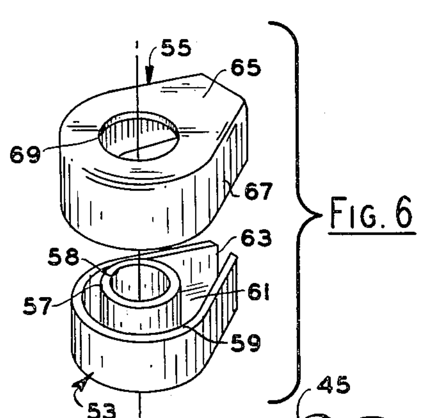
FIG. 6
FIG. 7
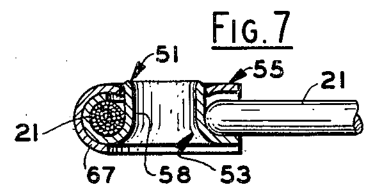
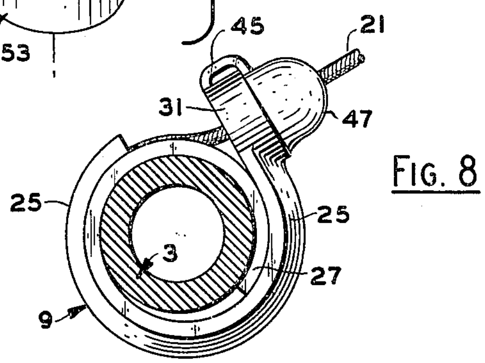
FIG. 8
GEORGE W. WRIGHT
HAROLD N. LEE
*INVENTOR.*
BY Edmund W. E. Kamm
ATTORNEY United States Patent Office 3,006,047
Patented Oct. 31, 1961

3,006,047

HOSE SLING

George W. Wright and Harold N. Lee, Fort Wayne, Ind., assignors to Tokheim Corporation, Fort Wayne, Ind., a corporation of Indiana Filed Apr. 18, 1960, Ser. No. 23,039
14 Claims. (Cl. 24—16)

This invention relates to a hose sling. More specifically it relates to a sling for attaching the retrieving cable of a cable reel to the discharge hose of a motor fuel dispenser.

Such hoses vary in outside diameter and present a difficult problem to provide a clamp which will be usable on all of the various hoses.

In manipulating a hose during a dispensing operation, the clamp or sling often comes into contact with a painted surface of the dispenser and unless the metal parts usually used in clamps are shielded, they will scratch or otherwise mar the finish.

Discharge hoses and parts fastened to them are usually subjected to rough usage and must be capable of withstanding such usage over a long period of time.

Some of the objects of the invention are to provide a sling which can be easily and quickly applied to a hose, which will firmly grip a hose of any of the usual diameters, which will not damage the dispenser finish, which will have a long life and which will be inexpensive.

These and other objects will become apparent from a study of this specification and the drawings which form a part thereof in which:

FIGURE 1 is a perspective view of a cable reel type of dispenser equipped with the hose sling, FIGURE 2 is a plan view of the sling in its free state, FIGURE 3 is a front elevation of the sling, FIGURE 4 is a cross-sectional view taken substantially on line 4—4 of FIGURE 3 showing the cable tunnel and locking rib, FIGURE 5 is a cross-sectional view taken substantially on the line 5—5 of FIGURE 3 showing the locking groove, FIGURE 6 is an exploded, isometric view of the eyelet parts, FIGURE 7 is a cross-sectional view of the eyelet installed on the cable, FIGURE 8 is an elevation showing the sling and cable attached to a hose.

Numeral 1 represents a motor fuel dispenser having a dispensing hose 3 which has one end attached to the discharge pipe (not shown) of the dispenser and has a nozzle 5 attached to the other end.

The hose is draped downwardly from its inlet end, in an upwardly facing bight 7 to a hose sling 9 and turns into a second upwardly directed bight 11 to the nozzle which is mounted on the support 13.

A cable reel 15 is mounted inside the housing 17 of the dispenser and has a spring 19 which urges the reel in a direction to wind up the cable 21 which is attached at one end to the reel and at the other end to the sling 9. The cable extends through a grommet 23 in the housing 17.

The cable is preferably a stranded wire cable having a plastic coating which presents a smooth exterior so that the cable will slide smoothly through the grommet 23 and will not mar or scratch the finished surfaces of the housing as the cable is withdrawn from or restored to the reel.

It will be seen from FIGURE 1 that by removing the nozzle from the support, a length of hose from the nozzle to the sling 9, which includes the portion stored in the bight 11, will be available to service a vehicle adjacent the dispenser. However should additional hose length be required to reach the fill opening of the vehicle, the operator may, by a pull on the hose, pull cable from the reel and thereby utilize additional portions of the hose which are stored in the bight 7.

When tension on the hose is relieved, the hose reel 15 will retract the cable 21 to restore the hose in bight 7 to its initial position and hold the sling against the grommet 23 under tension. The remainder of the hose will be returned to its initial position automatically as the nozzle is restored to the support 13.

The details of the hose sling are shown in FIGURES 2 to 8 inclusive. Referring first to FIGURES 2 and 3, the sling is made of a flexible, yieldable material such as vinylchloride-acetate ("Bakelite" VND–9950) although rubber or other similar materials may be employed.

The sling comprises an elongated body 25 which preferably has a width several times greater than its thickness. A tongue 27 projects longitudinally from one end of the body and a socket 29 is formed in a boss 31 at the other end of the body. A perforation 33 extends through the bottom wall 30 of the socket. A tunnel 35 is defined by body 25 and communicates at one end with the socket 29 and emerges at the other end of said body in alignment with a groove 37 which is formed in the upper side of the tongle 27. The tongue at the adjoining end of said body has a thickness substantially one half that of the body and preferably tapers to a lesser thickness at the free end of the tongue.

It will be seen from FIGURES 2 to 5 that the bottom surfaces of the body and tongue form two longitudinally continuous surfaces 39 which lie on opposite sides of a longitudinal rib 41 which extends throughout the combined length of the body and tongue except for the region of the boss 31. It will also be seen from FIGURES 4 and 5 that the lower end of the rib 41 is disposed at substantially the same level as the lateral edges 43 of both the body and the tongue. The rib and the groove 37 are both preferably located centrally of the width of the tongue so that when the sling is curled around a hose as shown in FIGURE 8, the rib 41 will enter the groove 37 and the free end of the tongue will thus be prevented from escaping laterally from the overlapping portion of the body.

Referring again to FIGURES 2 and 3 it will be seen that a strap 45 is formed integrally with and extends longitudinally from the free end of the body 25, which is actually the boss 31, and is integrally attached to a cap 47. As shown in FIGURE 3, a strap is disposed at substantially the same level as wall 30 and the bulk of the cap depends below the level of the strap. The cap 47 defines a through passage 49 which extends generally parallel to the perforation 33 and the strap 45 has a length such that the cap 47 will be disposed over and in closing relation with respect to the socket 29, as shown in FIGURE 8. The strap serves as a hinge for the cap.

Referring now to FIGURES 6 and 7, an eyelet indicated generally by numeral 51 comprises two pieces, namely a grommet 53 and a clamp ring 55. The grommet has an upstanding central tubular boss 57 which is substantially surrounded by an upstanding wall 59, which is spaced radially therefrom and is connected thereto by a bottom wall 61. The wall 59 extends in a generally horseshoe shape about the boss and the ends of the wall define a gap 63. The boss 57 is slightly higher than the wall 59 and is spaced from the wall a sufficient distance to admit a loop of the cable 21. The clamp ring 55 has a top wall 65 and a depending side wall 67 which has the same general shape as the wall 59 and is arranged to telescopically receive wall 59. The clamp ring is provided with an opening 69 through which the boss 57 extends when the two parts have been assembled following the insertion of the end of the cable. The two parts are then struck in a die so that the bottom portion of the wall 67 is crimped inwardly about the bottom of the wall 59 and the upper end of the boss 57 is swaged outwardly over the top wall of the clamp ring as shown in FIGURE 7. Also the top edge of the wall 59 of the grommet is swaged inwardly over the cable so that the cable is tightly clamped in the grommet and the ring is similarly clamped tightly to the grommet to form an eyelet for the end of the cable. The interior opening 58 through the boss 57 provides a passage for the other end of the cable so that a loop may be formed in the cable.

*Operation*

In order to assemble the sling and attach it to a hose, the free end of the cable, which is the end opposite to that fitted with the eyelet as described, is inserted in the tunnel 35 from the socket 29 and is pushed through the tunnel until the free end can be grasped, whereupon it may be withdrawn from the tunnel by pulling on the free end until the eyelet is seated in the socket 29. The cable may have to be rotated slightly so that the eyelet will seat squarely in the socket so as to align the opening 58 in the eyelet with the perforation 33 in the socket.

Next, the cap will be positioned over the socket 29 and the free end of the cable will be threaded through the perforation 33 from the bottom of the boss, that is, upwardly as shown in FIGURE 3, and will be passed through the eyelet and through the passage 49 in the cap 47. The cable will be drawn through these parts until a loop of ample size is formed, through which the free end of the hose 11 may be inserted as shown in FIGURE 8. The free end of the tongue 27 is then inserted between the hose and the body 25 so that the rib 41 on the body will enter the groove 37 of the tongue. The loop thus formed may then be tightened by pulling on the cable and by working the end of the tongue under the body until the tongue and the portion of the body contacting the hose will grip the hose. When this has been accomplished it is advisable to push on the cap 47 to seat it firmly on the boss 31 while pulling on the cable so that these parts will be displaced as far as possible toward the hose. The passage 49 in the cover 47 fits snugly on the cable and, by reason of its connection to the boss by means of the strap hinge 45, it acts as a grab or clutch which grips the cable and resists the slipping of the cable in a direction which would open the loop.

The free end of the cable is then inserted through grommet 23 and is attached to the cable reel in the usual manner.

The spring reel holds the cap 47 under tension against grommet 23 when the hose is in the idle position and thus tends to prevent the cable loop from loosening and, when the hose is in use in such a manner that the bight 7 is fully or partially extended, the reel exerts a tension on the cable which also tends to hold the loop closed and to hold the sling in proper gripping position with the hose.

It will thus be seen that the eyelet end of the cable is securely anchored in the hose sling by means of a metal eyelet and that this eyelet is seated in the socket 29 and covered by the cap 47 so that at no time can it come into contact with any portion of the finished housing surfaces. The cable itself, being plastic-coated, can do no damage to such surfaces.

It will be appreciated that the sling can readily be applied to hoses of different diameters because the free end of the tongue will merely enter to a greater or less extent beneath the body 25 as shown in FIGURE 8 but the gripping effect will remain the same. Since the rib 41 and the edges 43 of the body and tongue have limited surface contact with the exterior of the hose, the gripping action of the sling is accentuated.

The sling, being made of a relatively flexible material, adapts readily to the conformation of the surface of the hose and intimate contact is maintained between the sling and the hose so that the clamp will be additionally prevented from shifting along the hose.

Since the sling as shown in FIGURES 2 and 3 is formed by molding the plastic material in a die, a relatively complicated structure is produced at low cost. In actual use it has been extremely successful and it has the further advantage over the usual clamps that it does not damage the hose in any way.

It is of course obvious that the sling may be installed on a hose in a slightly different manner than that described above. After the cable has been passed through the tunnel 35 as described above it may be passed around the hose before the end of the cable is inserted through the perforation 33 and the openings 58 in the eyelet and 49 in the cap. The loop may then be drawn closed as described above and the tongue of the sling may be inserted under the body and drawn tight as described. Before applying the final tension to the cable, the sling may be adjusted to the proper position on the hose so that it will be tightened in such position by the final tensioning of the cable and the pressing of the cap against the boss.

It is obvious that various changes may be made in the form, structure and arrangement of parts of the specific embodiments of the invention disclosed herein for purposes of illustration, without departing from the spirit of the invention. Accordingly applicants do not desire to be limited to such specific embodiments but desire protection falling fairly within the scope of the appended claims.

We claim:

1. A hose sling of resilient, flexible material, comprising an elongated body having a greater width than thickness, having a tongue of less thickness than the body extending longitudinally from one end thereof and having a hollow boss at the other end, said boss having a perforated transverse wall defining therewith a socket, said body defining a tunnel which opens at one end in said socket and at the other end on one side of said tongue.

2. The structure defined by claim 1 wherein said tongue and body are longitudinally continuous on the opposite side of said tongue.

3. The structure defined by claim 2 wherein said one and said opposite sides of said tongue converge toward the free end thereof.

4. The structure defined by claim 1 wherein said tongue defines a groove extending from said body in substantially coaxial alignment with said tunnel.

5. The structure defined by claim 4 which includes a rib extending longitudinally along the body on the side opposite said tunnel and disposed for engagement with the groove of said tongue when said tongue and body are curled into a hose receiving loop with the rib disposed inside said loop and with the body overlapping said tongue.

6. The structure defined by claim 5 wherein said rib extends substantially the full length of said body and tongue.

7. The structure defined by claim 6 wherein the free end of said rib and the longitudinal edges of said body and tongue are disposed at substantially the same transverse level.

8. The structure defined by claim 1 wherein the wall of said socket is disposed at substantially the same level as said tongue.

9. The structure defined by claim 8 which includes a cap for said socket, said cap defining a bore which is aligned with said perforation when the cap is in place over the socket, and means for mounting said cap on said sling for movement to and from a position covering said socket.

10. The structure defined by claim 9 wherein said mounting means comprises a flexible hinge strap connected at one end to said boss and at the other end to said cap.

11. The structure defined by claim 1 which includes a cable, an eyelet fastened to one end thereof and seated in said socket, said cable extending sequentially from said socket, through said tunnel, over said tongue, through the perforation in said transverse wall, eyelet and socket and forming a loop, said tongue and a portion of said body lying inside said loop with the free end of said tongue departing from said cable adjacent said perforation and under-lapping the body.

12. The structure defined by claim 11 which includes a cap for said socket, said cap defining a bore through which said cable extends from said eyelet, said cable fitting tightly but slidably in said bore.

13. The structure defined by claim 12 which includes a hinge strap for said cap, extending from said boss to said cap.

14. The structure defined by claim 12 which includes a flexible strap-hinge having one end attached to the boss and the other end attached to the cap, said hinge extending substantially parallel to and at the level of the transverse wall, said cap extending from said hinge in a direction opposite to said boss, said hinge having a length sufficient to position said cap on said boss over said socket when said hinge is bent.

No references cited.